United States Patent
Quermann

[11] Patent Number: 4,487,083
[45] Date of Patent: Dec. 11, 1984

[54] PICK-OFF, TORQUER, AND REFERENCE SIGNAL GENERATOR FOR FREE ROTOR GYROSCOPES

[75] Inventor: Thomas R. Quermann, Suffolk, N.Y.

[73] Assignee: Sperry Corporation, New York, N.Y.

[21] Appl. No.: 741,916

[22] Filed: Nov. 15, 1976

[51] Int. Cl.[3] .................. G01C 19/22; G01C 19/28; G01C 19/30

[52] U.S. Cl. .................. 74/5.46; 74/5 F; 74/5.6 E

[58] Field of Search .................. 74/5.5, 5.46, 5.6 E, 74/5 F, 5.6 D, 5 R, 5.4, 5.41, 5.47; 310/156

[56] References Cited

U.S. PATENT DOCUMENTS

| | | | |
|---|---|---|---|
| 2,411,550 | 11/1946 | Lynn et al. | 74/5.5 |
| 2,753,718 | 7/1956 | Howe | 74/5.6 E |
| 2,815,584 | 12/1957 | Watson | 74/5.6 E X |
| 2,893,247 | 7/1959 | Stern et al. | 74/5.6 E |
| 2,919,404 | 12/1959 | Rock, Jr. | 74/5.47 X |
| 2,948,155 | 8/1960 | Burkam | 74/5.5 X |
| 3,142,993 | 8/1964 | Moller | 74/5.6 E |
| 3,240,075 | 3/1966 | Ranes | 74/5.5 |
| 3,252,340 | 5/1966 | Watt | 74/5.46 |
| 3,290,949 | 12/1966 | Samet | 74/5 F |
| 3,365,960 | 1/1968 | Siff et al. | 74/5 F X |
| 3,394,597 | 7/1968 | Frohmberg et al. | 74/5.6 D |
| 3,475,971 | 11/1969 | Binder et al. | 74/5.6 E |
| 3,529,477 | 9/1970 | Quermann | 74/5 F |
| 3,557,629 | 1/1971 | Quermann | 74/5 F X |
| 3,677,097 | 7/1972 | Quermann | 74/5 |
| 3,786,685 | 1/1974 | Lademann et al. | 74/5.5 |
| 3,845,995 | 11/1974 | Wehde | 74/5.46 X |

FOREIGN PATENT DOCUMENTS

| | | | |
|---|---|---|---|
| 1807477 | 6/1970 | Fed. Rep. of Germany | 74/5.6 |
| 157042 | 11/1956 | Sweden | 74/5.6 |
| 1258429 | 12/1971 | United Kingdom | 74/5.6 E |

Primary Examiner—Rodney H. Bonck
Attorney, Agent, or Firm—Howard P. Terry

[57] ABSTRACT

The invention is an integrated pick-off, torquer, and reference signal generator system for a two-degree-of-freedom flexure-suspended free-rotor gyroscope and a miniature gyroscope incorporating such an integrated system. The three gyroscopic functions are combined within apparatus including a single coil assembly using a radially permanent magnetized ring located on the gyroscope rotor wheel, with a plurality of pick-off coils mounted compactly with respect to the instrument case and each partially inserted in an air gap provided at the gyroscope rotor wheel periphery. The spacial flux magnitude variation around the rotor wheel in the air gap generates an alternating current in each pick-off coil as the rotor spins. The difference in the voltages induced in diametrically opposed pick-off coils provides an output pick-off signal, while the sum of the signals induced in all coils provides an alternating phase reference voltage. Since there is a finite unidirectional magnetic field in the air gap, controlled direct currents may be applied to the pick-off oils as an effective and economical way of torquing the gyroscope rotor without inducing any spurious error signals in the pick-off system.

8 Claims, 6 Drawing Figures

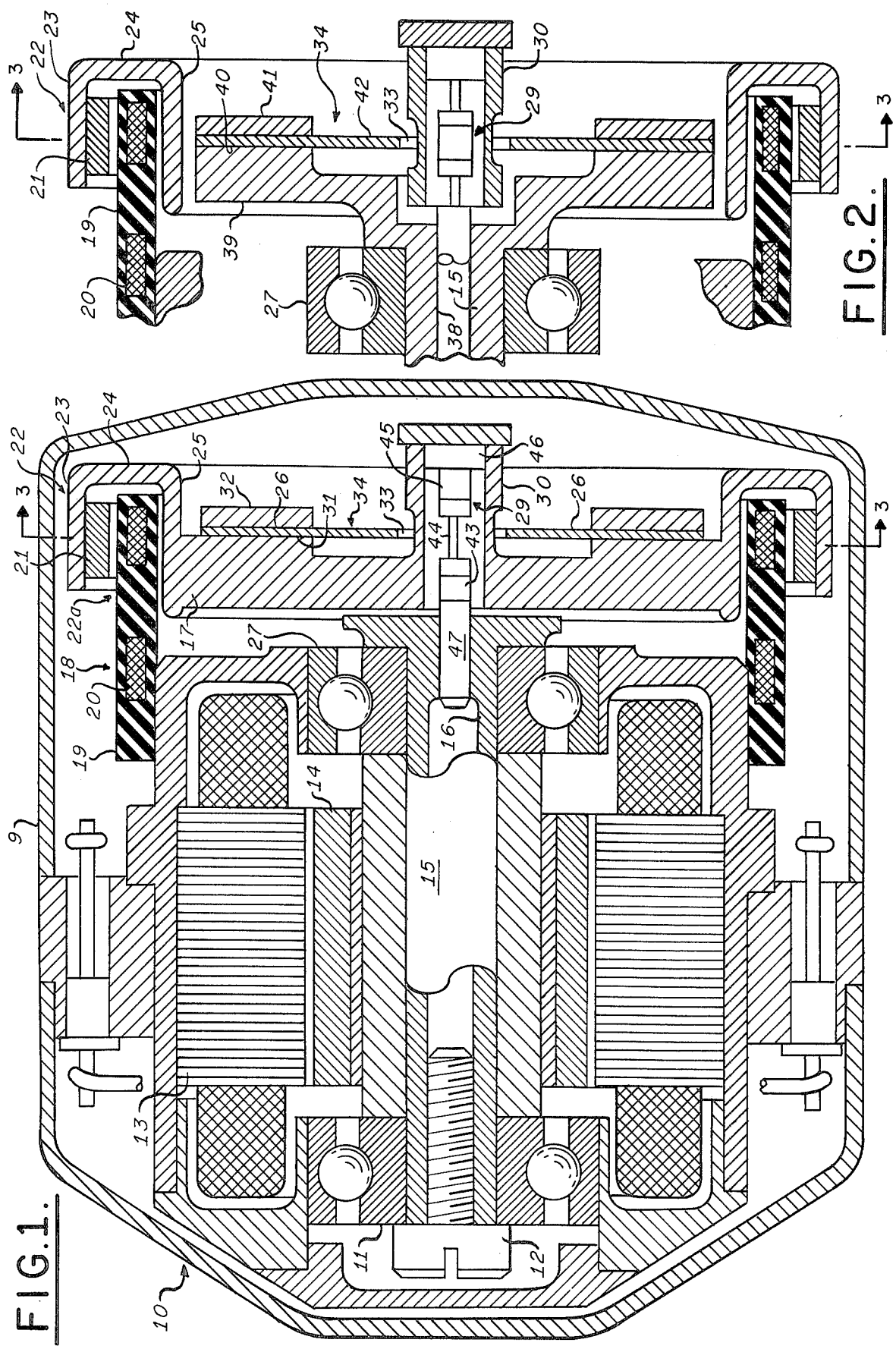

PICK-OFF, TORQUER, AND REFERENCE SIGNAL GENERATOR FOR FREE ROTOR GYROSCOPES

CROSS REFERENCE TO RELATED PATENT APPLICATION

This invention is related to the invention of the Thomas R. Quermann U.S. patent application Ser. No. 742,158, filed concurrently herewith on Nov. 15, 1976, for a "Flexure Suspension for Free Rotor Gyroscopes" and assigned to Sperry Rand Corporation.

BACKGROUND OF THE INVENTION

1. Field of the Invention

The present invention relates generally to gyroscopic instruments and is more particularly concerned with two-degree-of-freedom flexure suspended free-rotor gyroscopes.

2. Description of the Prior Art

Flexure suspended free-rotor gyroscopic devices are found in U.S. patents assigned to Sperry Rand Corporation, including:
- W. G. Wing—U.S. Pat. No. 2,719,291—"Rate of Turn Gyroscope", issued Sept. 27, 1955,
- T. R. Quermann—U.S. Pat. No. 3,529,477—"Gyroscopic Rotor Suspension", issued Sept. 22, 1970,
- T. R. Quermann—U.S. Pat. No. 3,557,629—"Pick-Off and Torquing Device", issued Jan. 26, 1971, and
- T. R. Quermann—U.S. Pat. No. 3,677,097—"Protective Stops for Flexure Suspended Gyroscopic Rotor", issued July 18, 1972.

These patents disclose concepts illustrating the results of recent efforts in the design of gyroscopic devices to achieve smaller, less expensive, and more reliable gyroscopic instruments for use in precision navigation and stabilization applications, including flight control systems. Some types of such prior art instruments have required either separate pick-offs or rotary transformers and resolvers, these representing complex and expensive expedients unsuited for use wherever compactness of design is a requisite.

On the other hand, the aforementioned U.S. Pat. No. 3,557,629 sought, for example, to overcome the problems of the prior art in providing a more nearly ideal pick-off, torquer, and reference signal generator system for such flexure suspended gyroscopes. In the prior art device of the latter patent, pick-off coils are mounted on the instrument housing, thus eliminating the need for expensive resolver apparatus, and second parts of the pick-off are located on the gyroscope rotor drive shaft. The torquing function is made generally integral with the pick-off function, thereby making the configuration relatively more compact than devices requiring fully separated pick-off and torquer devices. However, a large number of coils is required in the pick-off coil assembly, as well as a complex magnetic circuit difficult specifically to design in compact form and in general to machine and to assemble. It is also found to be difficult to eliminate all coupling between torquer and pick-off circuits.

SUMMARY OF THE INVENTION

The invention is a miniature two-degree-of-freedom flexure-suspended free-rotor gyroscope having novel features for overcoming the defects of the prior art. The invention finds application in free-rotor gyroscopes in which the rotor is spun about a spin axis by means of a cooperating motor and drive shaft. A first flexure support system radially supports the gyroscope rotor wheel coaxially on the drive shaft for universal tilting over a predetermined angular range about a pair of axes perpendicular to the spin axis. The exact axial position of the gyroscope rotor is defined by a second flexure support cooperating with the first flexure support and extending axially therethrough, again for universal tilting of the rotor wheel about a pair of axes at right angles to the rotor spin axis. A novel case-referenced position pick-off system is provided that also desirably performs torquing and spin reference frequency generation functions; it includes, for example, four coils disposed in a cylindrical shell mounted directly on the instrument housing, eliminating the multiplicity of coils of the prior arrangement. The assembly includes a permanently magnetized ring mounted on the gyroscope rotor disposed in an air gap at the periphery of the gyroscope rotor, and cooperating with pick-off coils which are also supported for operation within the same air gap. The spacial flux amplitude variation around the rotor wheel in the air gap generates an alternating signal in each pick-off coil when the rotor wheel is spun. The difference in the voltages induced in a diametrically opposed pair of pick-off coils provides an output pick-off signal proportional to angular tilt of the gyroscope rotor wheel about one axis perpendicular to the rotor spin axis. A second similar coil pair provides a second tilt signal with respect to a second axis perpendicular to the first tilt axis. The sum of the signals induced in all pick-off coils provides an alternating phase reference voltage. Furthermore, the finite unidirectional magnetic field present in the air gap provides a means for torquing the gyroscope rotor by applying controlled unidirectional currents directly through the pick-off coils.

BRIEF DESCRIPTION OF THE DRAWINGS

FIG. 1 is an elevation view of a free-rotor gyroscope in cross section illustrating the novel free rotor gyroscope pick-off, torquer, and reference signal generator system.

FIG. 2 is a fragmentary cross section view taken at ninety degrees to the section of FIG. 1.

DESCRIPTION OF THE PREFERRED EMBODIMENTS

Figure 6:
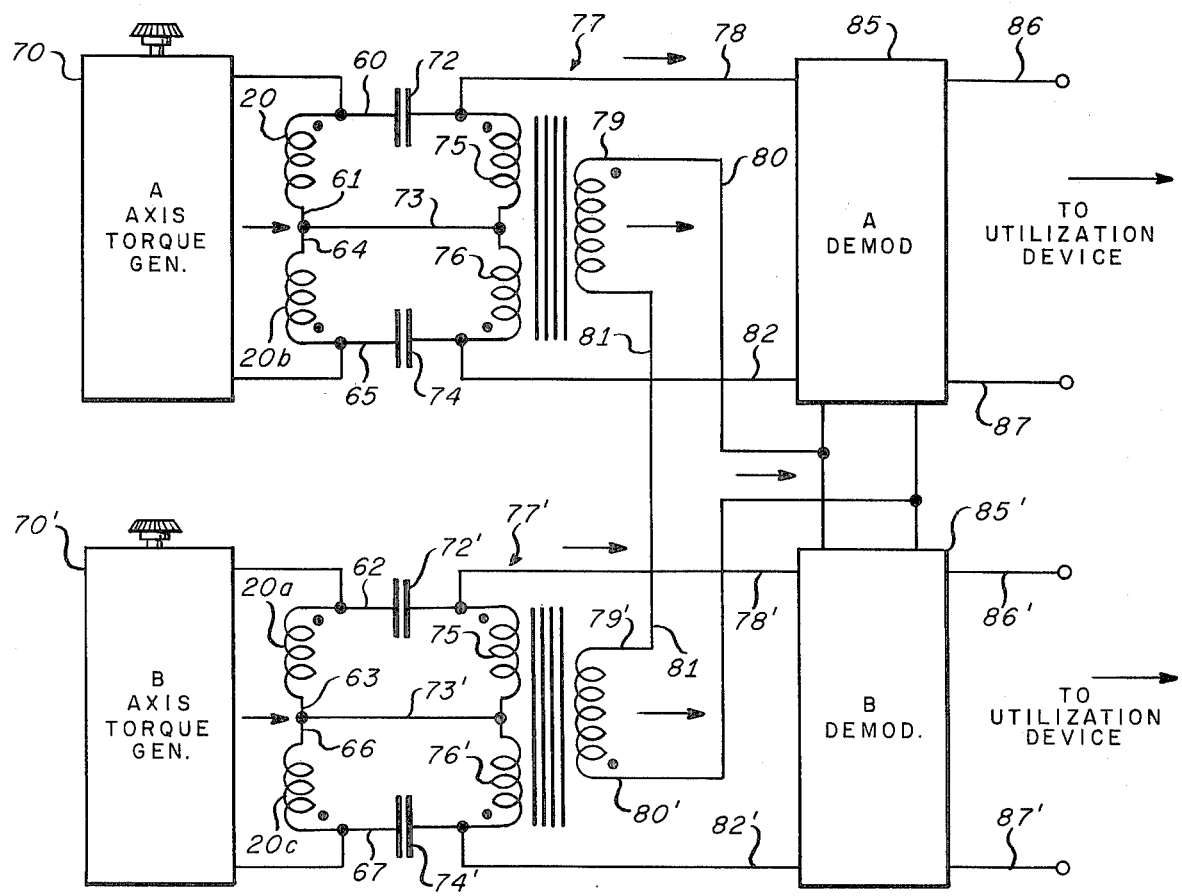
FIG. 6 is the wiring diagram of a novel circuit employing the pick-off and spin reference output signals of the instrument and providing circuit means for torquing the instrument.

Referring to FIGS. 1 and 2, a gyroscope 10 according to the invention is shown having a housing 9 within which are mounted anti-friction bearings 11 and 27 that journal a drive shaft 15 about its geometrical spin axis. Drive shaft 15 is rotated by a generally conventional synchronous spin motor having a stator 13 and a rotor 14 of the kind described in the aforementioned patents, for example. A gyroscopic rotor wheel 22 is radially suspended by a flexure support spider 34 shown more clearly in FIG. 3 as having four equiangularly disposed resilient thin flat arms 26, 26, 42, 42 which flexibly support gyroscopic rotor 22 for rotation about the normal spin axis. Gyroscope rotor 22 is supported in the spin axis direction by a further flexure support or strut 29 which has a longitudinal strut axis extending through an aperture 33 in the radial flexure spider 34. Flexure support 29 has an extension 47 into hollow shaft 15 whereby it is affixed within shaft 15. The dual flexure support system 29, 34 is the subject of the aforementioned T. R. Quermann patent application Ser. No. 742,158, filed concurrently herewith; it will be recognized that flexible support arrangements such as disclosed in the aforementioned patents may also readily be substituted, though the arrangement of the copending application is to be preferred.

Now referring particularly to FIG. 3, the component parts of the suspension system will be described. Continued reference should also be had to FIGS. 1 and 2 for an understanding of the particular disposition of the elements of FIG. 3 with respect to the portion of the instrument already described. The exploded view of FIG. 3 illustrates the general relation of the several parts of the suspension system, including the flexible support strut device 29, the flexible support spider 34, cementing plates 32, 32, the bridge 39, and the gyro rotor wheel 22.

The cruciform radial support spider 34 is fabricated from a thin resilient flat metal sheet as a cross-shaped part having a central clearance aperture 33 and four somewhat enlarged pads on the opposed ends of the arms 26, 26, 42, 42 of the cross. In one compact successful version of the device whose outer case 9 (FIG. 1) was 0.795 inches in diameter and 0.858 inches long, the cross-shaped support 34 had dimensions a=0.052 inches and b=0.037 inches, and was made of a metal sheet 0.001 inches thick, being formed by photo-etching. One pair of diametrically opposed pads on arms 42, 42 is, during assembly, affixed to the mating bosses 40, 40 of bridge 39 seen also in FIG. 2. In this instance, and in many other locations, fastening of parts by the use of conventional quick-setting adhesives is accomplished, using epoxy resins or the like. The other pair of pads on the ends of the second pair of arms 26, 26 of cross-shaped flexure or spider 34 is affixed by adhesive material to a similar pair 31, 31 of bosses rising from the single spoke 17 of the gyroscope rotor wheel 22. It will be apparent to those skilled in the art that other conventional mechanical fasteners or fastening methods may be employed in lieu of adhesives.

Figure 3:
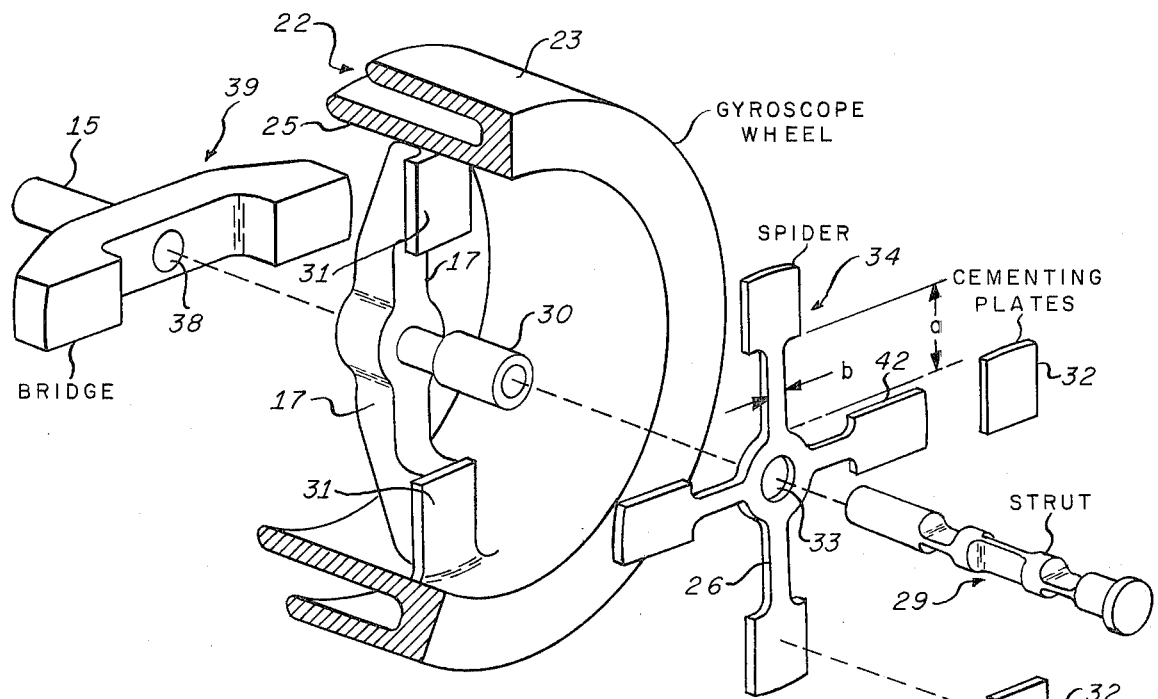
FIG. 3 is a perspective exploded view of suspension elements of the gyroscope.

The axial suspension strut 29 consists of a machined round cylindrical rod shown in FIGS. 1, 2 and 3 as having three flat flexure elements 43, 44, 45 milled in its active flexure region. The cylindrical portion 47 of the rod is affixed within shaft 15 in the central bore 38, while its opposite cylindrical portion 46 is fixed to the spoke 17 of gyroscopic rotor wheel 22 through tubular projection 30. The end flexures 43 and 45 lie in the same plane, a plane perpendicular to the plane of the intermediate flexure 44. Flat flexure element 44 is preferably twice as long as either of the equal length end flexure flat elements 43, 45.

The suspension system provides translational rigidity along three mutually perpendicular axes and a low torsional restraint in a simple, low cost configuration having an inherently low sensitivity to twice-rotor-speed vibration. The use of the series of three flat flexure elements results in a desirable and significant reduction in the flexural rigidity of support strut 29. The use of the three flat flexure elements 43, 44, 45 advantageously keeps the center of flexing constant, no matter what the direction of deflection of gyroscope rotor wheel 22. As shown in FIGS. 1 and 2, the intermediate flat flexure element 44 is centered in the aperture 33 in the cruciform radial flexure spider 34.

In operation, all radial and drive motor torque loads on the rotating system are carried by cruciform suspension spider 34. Member 34 accommodates tilt of the gyroscope rotor wheel 22 with respect to drive shaft 15 by twisting deflection of its crossed arms. In fact, the central part of the cross-shaped suspension spider 34 may be likened to the intermediate gimbal of a Hooke's universal joint. Because this effective gimbal is formed from the extremely thin metal film of cruciform suspension 34, it is inherently mass-balanced with respect to the two mutually perpendicular pivot axes and the gyroscope thus has a low inherent sensitivity to twice rotor speed vibration.

In operation, all axial loads on the rotating system are carried by the triple flexure support strut 29. As previously noted, strut 29 is proportioned with the flat intermediate flexure element 44 twice as long as each of the two flat end flexure elements 43, 45. Such a configuration has equal flexural stiffness in any deflection direction, as well as equal columnar strength. Although the axial support of the effective central gimbal portion of the radial suspension is soft, the extremely low mass of the effective gimbal prevents an excessive anisoelastic acceleration sensitivity.

In FIGS. 1 and 2, it is seen that the axially disposed triple flexure system 29 is affixed at one end of its axis through hollow tube 30 to spoke 17, while strut system 29 is fixed at its opposite end in the bore 38 in hollow drive shaft 15. The opposite end of hollow shaft 15 is provided with a machine screw 12 mating with a thread internal of hollow shaft 15. The races of ball bearings 11 and 27 are thus confined between a flanged portion 16 from which bridge or yoke 39 extends and the head of machine screw 12 when the latter is tightened. There may be used a magnetic suspension spring compensation system (not shown) of the type disclosed in U.S. Pat. No. 2,719,291.

Figure 4:
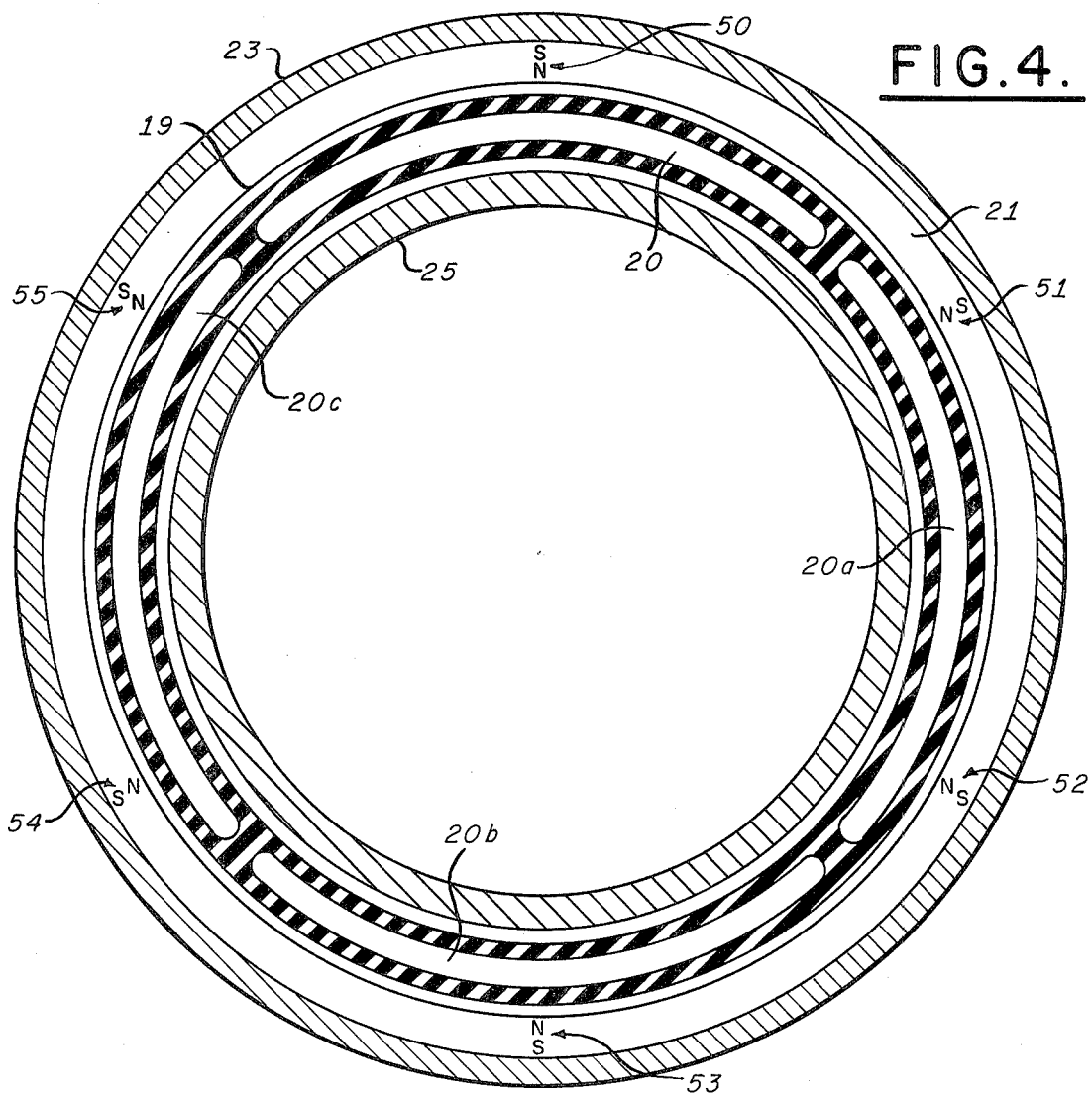
FIG. 4 is a cross section view of the pick-off, torquer, and reference generator system taken along the lines 3—3 of FIGS. 1 and 2.

As has been noted, the gyroscope rotor wheel 22 is flexibly attached to and is driven by hollow shaft 15; the gyroscope rotor includes a ring-shaped or annular channel 22 at the periphery of the rotor as is seen in FIGS. 1, 2, 3 and 4. The open end of annular channel 22 faces motor 13, 14 of the instrument and provides an air gap region generally indicated at 22a, the channel 22 being constructed of soft iron and having integrated legs 23, 24, 25 for providing a magnetic circuit including air gap 22a. Within air gap 22a and affixed by a conventional adhesive to the inner surface of the outer leg 23 of the annular channel 22 for rotation therewith is a continuous ring-shaped permanent magnet 21, which magnet may be constructed as a flat cylinder of a conventional magnet alloy such as a platinum-cobalt or other permanent magnet alloy having similar characteristics. The magnetic material of the ring is permanently magnetized in the radial direction, for example, at six equiangularly spaced sites 50, 51, 52, 53, 54, and 55, as seen in FIG. 4. All of the magnetic sites are polarized in the same radial sense, as is indicated, for example, by the letters N indicating the north poles shown at the inner surface of ring magnet 21. Each such north pole effectively occupies a finite surface area; between adjacent poles, however, the magnetization falls to a low value or preferably even to zero. Thus, a unidirectional magnetic field resides in air gap 22a between ring magnet 21 and the second or inner leg 25 of annular channel 22 whose amplitude varies in a generally sinusoidal or undulating manner around air gap 22a.

Figure 5:
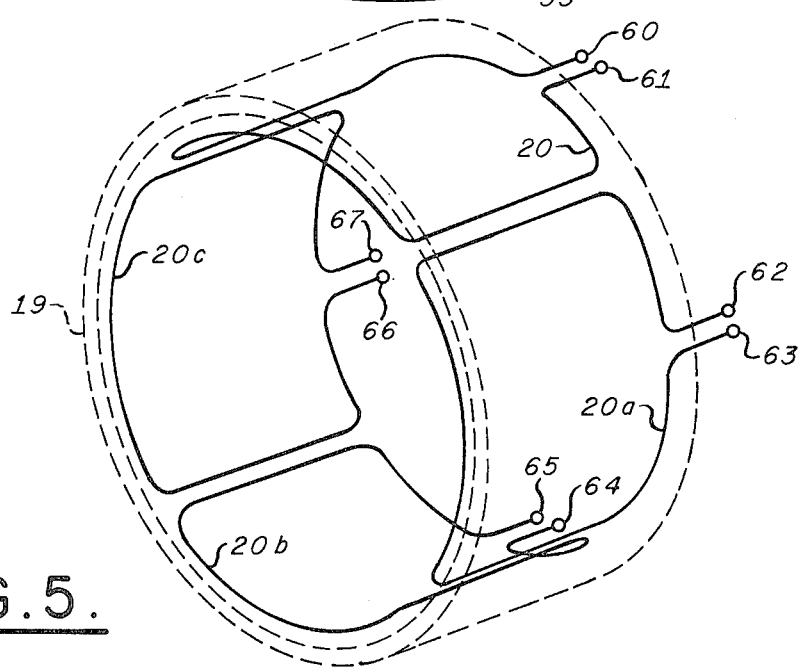
FIG. 5 is a phantom perspective view schematically showing the disposition of the coils in the air gap of FIGS. 1 and 2.

While, in the example, six permanently magnetized sites are provided on the permanent magnet ring 21, they are arranged to cooperate with four coils 20, 20a, 20b, 20c, and are disposed in a cylindrical shell 19 of electrically insulating material such as a conventional plastic composition. The coils 20, 20a, 20b, 20c are disposed generally conformally within cylindrical shell 19, so that they may be supported by shell 19 partly in the annular air gap 22a. In this manner, the four coils are mounted in the tubular shell 19 for fixed support with respect to the instrument case 9, the edge of each coil being inserted into a sector of air gap 22a between the permanently magnetized ring 21 and the inner leg 25 of soft iron channel 22. In view of the use of four coils 20, 20a, 20b, 20c, and of the six permanently magnetized sites 50, 51, 52, 53, 54, 55, the angular length of each coil along air gaps 22a as seen in FIG. 4, is approximately 1.5 times the angular distance between the centers of the magnetized sites 50, 51, 52, 53, 54, 56 in permanent magnet ring 21. The phantom view of FIG. 5 represents the multi-turn coils 20, 20a, 20b, 20c as having only one turn per coil merely for the sake of providing an uncluttered drawing; its purpose is to illustrate output leads 60, 61 of coil 20, leads 62, 63 of coil 20a, leads 64, 65 of coil 20b, and leads 66, 67 of coil 20c. It will be understood that the number of magnetized sites described in the aforegoing example was chosen merely by way of example, and that this number may be changed as circumstances dictate. If the space between the effective centers of the magnetic north poles is called S, and if the length of each coil within the air gap 22a is called T, then the law relating to these dimensions for maximum reference output is $$T = (n - \tfrac{1}{2})S$$

where n is a positive integer not zero.

In FIG. 6, coils 20 and 20b are arbitrarily designated as A axis coils; they are connected in series and poled as conventionally indicated in the figure by dots. The center leads 61, 64 of the respective coils 20, 20b are directly connected via lead 73 to a center tap of the input winding 75, 76 of isolation transformer 77, transformer 77 being poled as indicated. Lead 60 of coil 20 is coupled by capacitor 72 to a second input of transformer coil 75 while lead 65 of coil 20b is coupled by capacitor 74 to the opposed input of transformer coil 76. Leads 60, 65, being respectively connected for alternating current energy differentially across coils 20, 20b, are employed to couple an alternating signal proportional to tilt about the A axis of the instrument to the conventional A channel demodulator 85 for use in the conventional manner for producing a variable polarity, variable magnitude output control voltage across leads 86, 87. It will be evident to those skilled in the art that the B axis channel is constructed and operates in a similar manner, the primed numbers indicating corresponding parts, deriving differential alternating signals across coils 20a, 20c for coupling via capacitors 72′, 74′ to the B channel demodulator 85′. In this manner, the alternating voltage proportional in amplitude to tilt of the gyroscopic rotor about the B axis is applied to B channel demodulator 85′ for producing a second variable polarity, variable amplitude control voltage appearing on leads 86′, 87′.

The output windings 79, 79′ of the respective transformers 77, 77′ are connected in series addition as shown in FIG. 6 to provide a phase reference alternating signal on leads 80, 81. The phase reference signal is applied to the respective A and B channel demodulators 85, 85′ to serve as reference signals therein for the demodulation of the error signals on the respective leads 78, 82 and 78′, 82′.

For torquing the instrument about its A axis, unidirectional currents from a suitable torque signal generator 70 are coupled to leads 60, 65. Similarly, to torque the instrument about its B axis, unidirectional currents arising in a similar conventional torque signal generator 70′ are coupled to leads 62, 67. Since respective capacitors 72, 74 and 72′, 74′ are present, the consequent introduction of such direct current torque signals into coils 20, 20a and 20b, 20c has substantially no effect on the operation of the apparatus.

In the operation of a typical example of the invention, shaft 15 is driven at 400 revolutions per second. As the spacially modulated magnetic field around air gap 22a passes each coil 20, 20a, 20b, 20c, an alternating voltage is induced in each such coil at a frequency six times the gyroscope rotor wheel frequency, or at a 2.4 KHz frequency. When the gyroscope rotor remains at its mechanical null position with its spin axis coincident with the axis of drive shaft 15, the alternating voltages induced in each coil are substantially equal, and the phases of the voltages in diametrically opposite coils, such as coils 20, 20b and coils 20a, 20c, are substantially the same. Whenever the gyroscope rotor 22 tilts with respect to coils 20, 20a, 20b, 20c, the equality of the voltages induced in diametrically opposed pick-off coils is disturbed. The difference in the outputs of opposed pick-off coils is, accordingly, a measure of the angular displacement of the gyroscope rotor 22 about an input axis such as axis A, for example.

The desired pick-off output signals are obtained, as shown in FIG. 6, by connecting diametrically opposed pick-off coils in series opposition. The phase reference frequency needed for demodulation of the pick-off signals is obtained by summing the outputs of all four pick-off coils 20, 20a, 20b, 20c, employing the center-tapped transformers 77, 77′ for the purpose. Other known circuits for performing the addition function may be employed. Because the average magnetic field produced by the annular permanent magnet ring 21 and its associated soft iron annular channel 22 in the region of each coil 20, 20a, 20b, 20c is not zero, the passage of a controllable amplitude unidirectional torquing current in a coil produces a force parallel to the axis of drive shaft 15 at the arcuate plane of the coil. By passing the direct current through diametrically opposed coils in opposite directions, a position-correcting torque is exerted on the gyroscope rotor wheel 22. By adding blocking capacitors 72, 74, 72′, 74′ to bar such direct currents from transformers 77, 77′, this mode of operation is entirely practical without requiring additional coils or other complicating and space-consuming elements within the gyroscope structure over and above those few needed merely to produce in common the tilt error signals and the phase reference voltages.

The prime difficulty with the combined pick-off and torquer assemblies of the prior art lies in the tendency of the torquer coils undesirably to couple to the pick-off coils, thus producing spurious displacement command signals. The present invention overcomes this problem by making the entire portion of the gyroscope wheel which cooperates in the pick-up torquer function have continuous, easily machined cylindrical surfaces and by using a permanent magnet 21 in the form of a cooperating cylindrical shell of a material having a permeability of substantially unity. Because the total reluctance of the magnetic circuit including the U-shaped annular channel 22 of the gyroscope is almost entirely defined by air gap 22a, the difference in reluctance for a given circumferential arc of the magnetic circuit in a region with a magnetized site from that of a similar arc of a substantially non-magnetized region between magnetized sites is negligibly small. The modulation of the air gap flux produced by direct current torquing as the gyroscope rotor wheel rotates is therefore quite negligible.

A novel feature of the invention lies in the use of a continuous cylindrical magnet 21, permanently magnetized in the same radial direction in a first plurality of discrete spaced locations so as to provide a spacially modulated unidirectional radial magnetic field at the periphery of the gyroscope rotor wheel, while still maintaining a constant reluctance air gap 22a in the magnetic circuit. This feature permits use of a different plurality of coils for performing the pick-off, torquer, and phase reference generator functions without crosscoupling between torquer and pick-off elements. Because the invention desirably integrates functions which formerly required an excessive number of individually acting parts and because its parts are cylindrical requiring relatively little milling during fabrication, very compact configurations are readily feasible. In addition, cost of manufacture is significantly cut.

While the invention has been described in its preferred embodiments, it will be understood that the words which have been used are words of description rather than of limitation and that changes within the purview of the appended claims may be made without departure from the true scope and spirit of the invention in its broader aspects.

I claim:
1. In gyroscopic apparatus:
housing means,
drive shaft means journalled in said housing means,
rotor means adapted for spinning about a spin axis of said drive shaft means,
flexure means supporting said rotor means for tilting about first and second tilt axes perpendicular to said spin axis,
annular channel means at the periphery of said rotor means having a continuous uniform interior cylindrical region therein open at one end thereof and closed at the opposite end thereof,
said interior cylindrical continuous uniform region being disposed between continuous uniform first and second cylindrical interior surfaces of said annular channel means coaxial with said spin axis,
cylindrical permanent magnet means having inner and outer cylindrical magnetic surfaces,
said outer cylindrical magnetic surface being affixed to said continuous uniform first cylindrical interior surface for forming a continuous uniform cylindrical magnetic circuit gap between said inner cylindrical magnetic surface and said continuous uniform second cylindrical interior surface,
said cylindrical permanent magnet means having substantially unity permeability and cooperating with said annular channel means for providing a unidirectional radial magnetic field regularly varying in magnitude between maximum and minimum values around said continuous uniform cylindrical circuit gap,
induction means supported from said housing means for cooperatively detecting said regularly varying unidirectional radial magnetic field and for exerting torques upon said rotor means about said respective first and second tilt axes when energized by direct torquing current whereby modulation of the magnetic flux in said continuous uniform cylindrical circuit gap produced by direct torquing current is negligible.

2. Apparatus as described in claim 1 wherein:
said inductive means includes a plurality of discrete torquer-pick off coils, each extending into said continuous uniform cylindrical magnetic circuit gap for cutting lines of said magnetic flux when said rotor means is spun,
each said discrete torquer-pick off coil lying in an arcuate plane conformal with a predetermined sector of said continuous uniform cylindrical magnetic circuit gap,
said cylindrical permanent magnet means having discrete radially magnetically polarized regions equally spaced thereabout.

3. Apparatus as described in claim 1 wherein said inductive means includes at least a first pair of discrete torquer-pick off coil means in differential series connection and spacially opposed, each coupled to said unidirectional radial magnetic field when said rotor means is spun,
source means for coupling a controllable direct torquing current serially through only said first pair of discrete torquer-pick off coil means for positioning said rotor means about said first tilt axis, and
pick off circuit means responsive to a variable amplitude, reversible phase, alternating signal flowing serially through said first pair of discrete torquer-pick off coil means for generating an output control signal representing only a measure of tilt of said rotor means about said first axis irrespective of the presence of said direct torquing currents.

4. Apparatus as described in claim 3 wherein said pick off circuit means includes:
demodulator means having first and second input means,
capacitor means for coupling only said variable amplitude, reversible phase, alternating signal from said first pair of discrete torquer-pick off coil means to said demodulator means first input means, and
additional circuit means for supplying a phase reference signal from said capacitor means to said demodulator means second input means, whereby said demodulator means provides said first input control signal.

5. Apparatus as described in claim 4 wherein said additional circuit means includes:
transformer means having input and output winding means, said input winding means being capacitively coupled by said capacitor means across said first pair of discrete torquer-pick off coil means, and said output winding means being coupled to said demodulator means for supplying said phase reference signal thereto.

6. Apparatus as described in claim 2 wherein the length of each said discrete torquer-pick off coil means lying within a corresponding sector of said continuous uniform cylindrical magnetic circuit gap is substantially 1.5 times the angular distance between the effective centers of said discrete radially magnetically polarized equally spaced regions.

7. Apparatus as described in claim 6 wherein four of said discrete torquer-pick off coil means lie in equiangularly spaced contiguous relation and cooperate with six of said radially magnetically equally spaced polarized regions.

8. In gyroscope apparatus:
housing means,
drive shaft means journalled in said housing means,
rotor means adapted for spinning about a spin axis of said drive shaft means,
flexure means supporting said rotor means for tilting about first and second tilt axes substantially perpendicular to said spin axis,
annular channel means at the periphery of said rotor means having a continuous uniform interior cylindrical region therein open at one end thereof and closed at the opposite end thereof,
    said continuously uniform interior cylindrical region being disposed between continuously uniform first and second cylindrical interior surfaces of said annular channel means coaxial with said spin axis,
cylindrical permanent magnet means having inner and outer cylindrical magnet surfaces,
    said outer cylindrical magnet surface being affixed to said continuous uniform first cylindrical interior surface for forming a continuous uniform cylindrical magnetic circuit gap between said inner cylindrical magnet surface and said continuous uniform cylindrical interior surface,
    said cylindrical permanent magnet means having substantially unity permeability and cooperating with said annular channel means for providing a unidirectional radial magnetic field regularly varying in magnitude between maximum and minimum values around said continuous uniform cylindrical circuit gap,
inductive means supported from said housing means for cooperatively detecting said regularly varying unidirectional radial magnetic field and for exerting torques upon said rotor means about said respective first and second axes when energized by direct torquing current, modulation of the gap flux produced by the torquing current being negligible, said inductive means including:
    a first pair of discrete torquer-pick off coil means in differential series connection and spacially opposed within said housing,
    a second pair of discrete torquer-pick off coil means in differential series connection and in spacially opposed relation interposed between said first pair of discrete coil means in their said housing,
    said first and second pairs of discrete torquer-pick off coil means being coupled to said regularly varying unidirectional magnetic field when said rotor means is spun,
said apparatus further including:
    first and second demodulator means,
    first and second capacitor means for respectively coupling said respective first and second pairs of discrete torquer-pick off coil means to first inputs of said respective first and second demodulator means, and
    first and second circuit means additionally respectively coupled between said first and second capacitor means and second inputs of said respective first and second demodulator means, whereby said respective first and second demodulator means supply respective variable polarity, variable amplitude output control signals proportional to tilt of said rotor means about said first and second respective tilt axes irrespective of the presence of direct torquing current within said first or second pairs of discrete torquer-pick off coil means.

* * * * *